July 26, 1927.
G. WANDSCHEER
BEET HARVESTER
Filed May 29, 1925
1,636,883
2 Sheets-Sheet 1
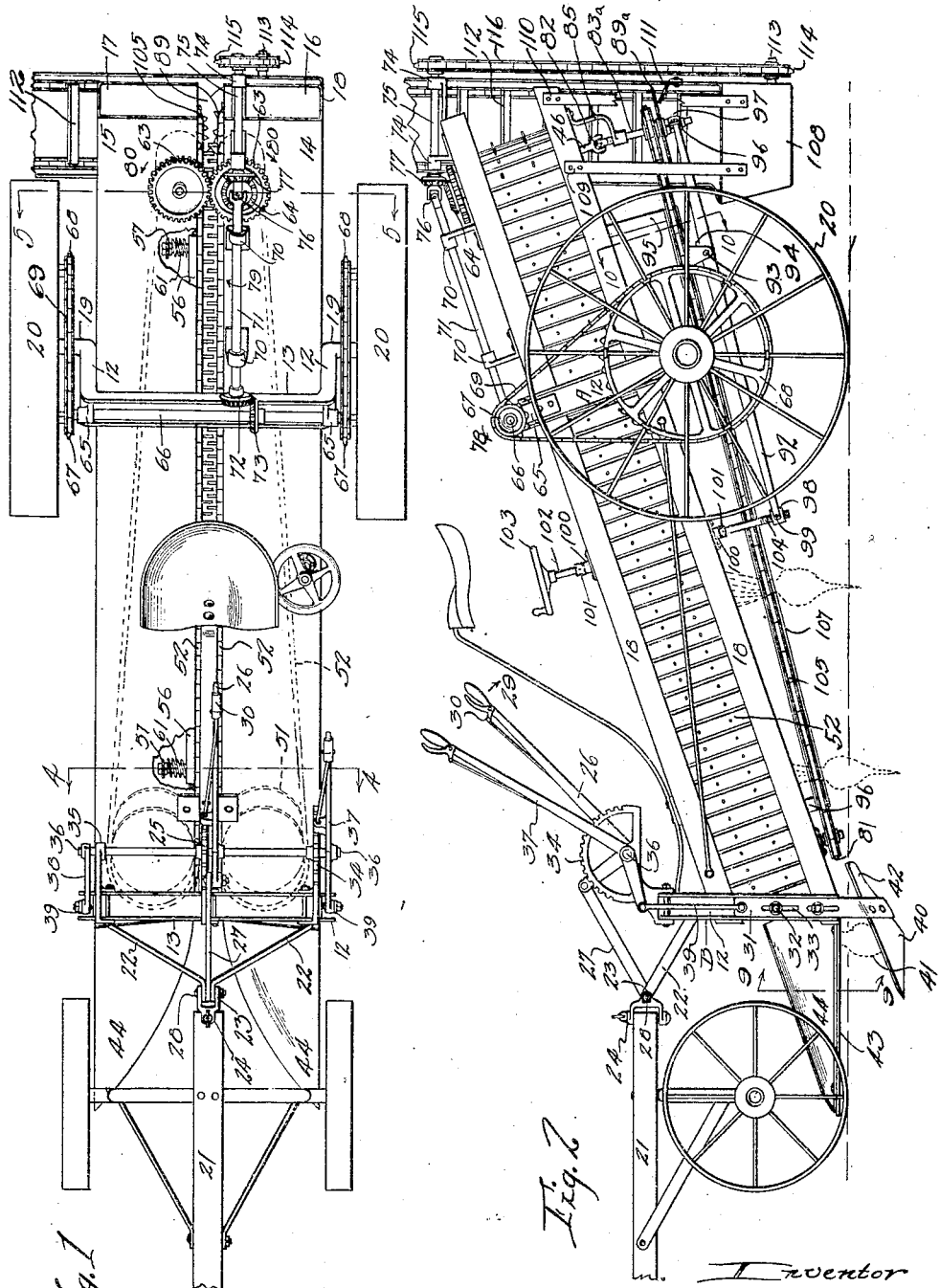
Inventor
Gerritt Wandscheer
By Dair, Freeman & Latta,
Attys July 26, 1927. 1,636,883
G. WANDSCHEER
BEET HARVESTER
Filed May 29, 1925 2 Sheets-Sheet 2
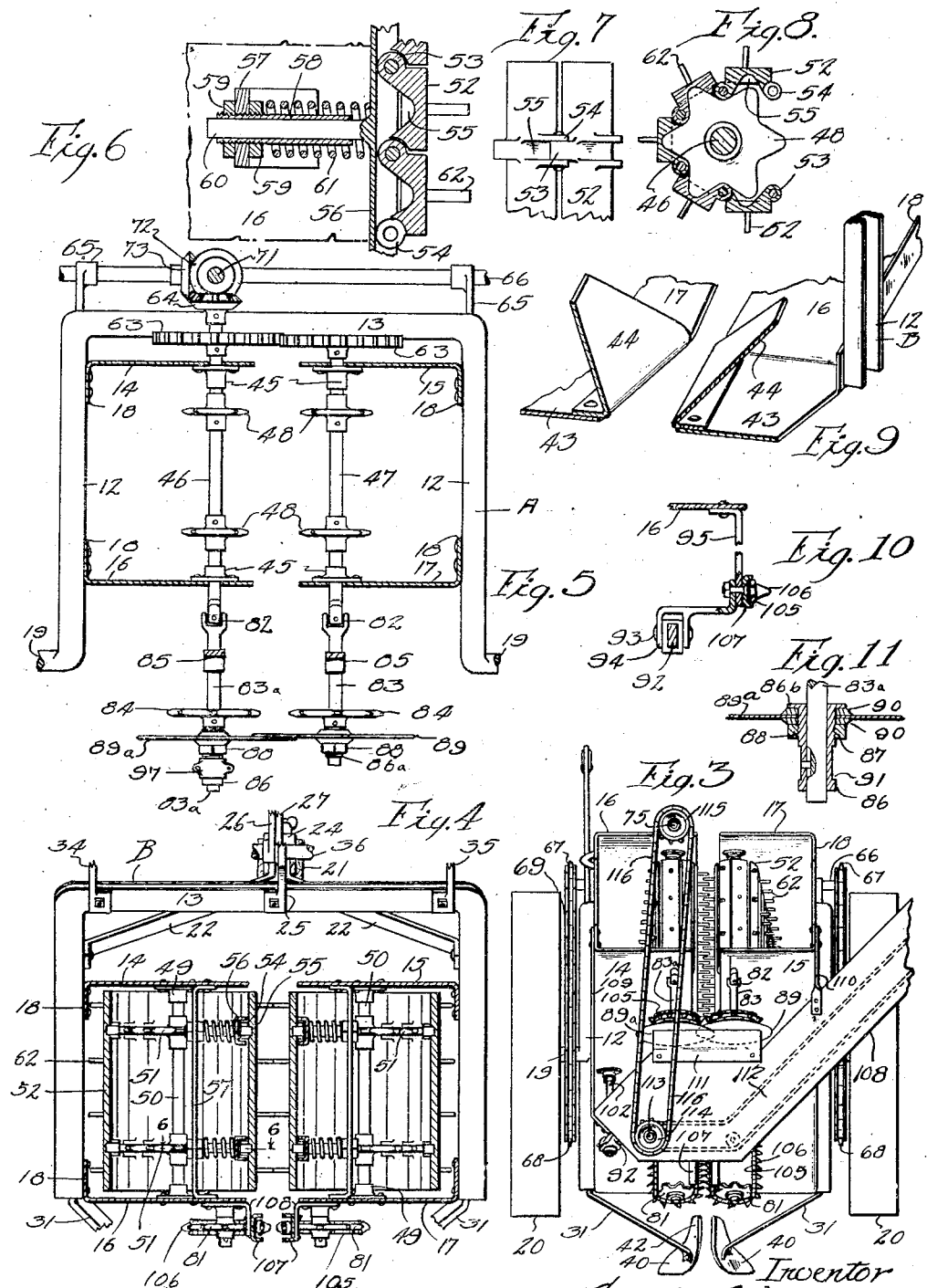

Patented July 26, 1927.

1,636,883

UNITED STATES PATENT OFFICE.

GERRIT WANDSCHEER, OF SIOUX CENTER, IOWA.

BEET HARVESTER.

Application filed May 29, 1925. Serial No. 33,633.

My invention relates to a harvester for bulbous plants having branching tops protruding above the earth in which they grow, and is particularly designed for harvesting sugar beets and the like.

It is my object to provide such a machine which is of simple, durable and inexpensive construction.

A further object is to provide a machine which will grasp the plants by the protruding tops, lift them from the ground as it progresses, sever the tops from the bulbs and elevate the bulbs into a suitable receptacle.

More specifically, it is my object to provide a machine which will accomplish the above by means of a pair of endless belts having opposed faces, traveling upwardly and rearwardly, between which the beet tops are engaged, and which travel at the same lineal speed in a rearward direction as the forward rate of travel of the vehicle, whereby the plants will be lifted vertically from the ground as the vehicle progresses.

Another object is to provide a harvester in which the tops are severed by means of a pair of rotating disks, driven from the same means which drive the belts and between which the belts carry the plants.

Another object is to provide means for uniformly presenting the plants to the cutting disks so that the cutting may be effected just above the shoulders of each plant.

More specifically, the last mentioned object is accomplished by means of a pair of endless chains traveling in paths situated substantially vertically below the paths of the belts, and in a plane which is inclined upwardly and rearwardly at an angle of less inclination than that of the belts, whereby the belts will tend to pull the shoulders of the beets against the lower edges of the chains, thereby to position the beets for proper presentation to the knives.

A further object is to provide means for adjusting the position of the knives relative to the chains.

Another object is to provide a harvester in which the bulbs are loosened from the soil by a pair of blades which urge them upwardly, just prior to the engagement of the tops by the belt mechanism.

A still further object is to provide means for adjusting the vertical height of the harvester.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of a harvester, parts being broken away to better illustrate the invention.

Fig. 2 is a side elevation of the harvester.

Fig. 3 is a rear elevation of the harvester.

Fig. 4 is a detail sectional view taken on the line 4—4 of Fig. 1.

Fig. 5 is a detail sectional view taken on the line 5—5 of Fig. 1.

Fig. 6 is a detail sectional view taken on the line 6—6 of Fig. 4.

Fig. 7 is a detail view illustrating a portion of the inner sides of two of the belt links.

Fig. 8 is a detail sectional view illustrating one of the upper belt sprockets.

Fig. 9 is a detail perspective sectional view, taken as indicated by the line 9—9 of Fig. 2.

Fig. 10 is a detail sectional view taken on the line 10—10 of Fig. 2, and

Fig. 11 is a detail sectional view illustrating the mounting of one of the cutting knives.

The harvester vehicle has a framework comprising a pair of inverted arches, A and B, each having the vertical side arms, 12, and upper transverse beam, 13, connecting the two side arms.

Four plates of sheet steel, 14, 15, 16 and 17, respectively, each have the flanges, 18, bent at right angles to the plates and riveted or otherwise secured to the side arms, 12, of the arches, A and B, respectively.

The plates, 14 and 15 are spaced from each other in the same plane, and the plates, 16 and 17, are similarly spaced in a plane below that of the plates, 14 and 15, and parallel thereto. The flanges, 18, are extended toward each other, thus forming, together with the plates, a partially enclosed boxlike structure which serves as a housing for the belts, which will hereinafter be described.

The arches, A and B, are of channel iron, the flanges thereof extending outwardly, and the arch, A, is provided at the lower ends of the arms, 12, with integral stub shafts, 19, upon which are mounted the traction wheels, 20.

A tongue truck, 21, is provided to support the forward end of the frame, and is connected therewith in such a manner that the harvester body may be raised or lowered relative to the truck, as will now be described.

Pivoted to the arms, 12, of the arch, B, as shown in Figs. 2 and 4, are a pair of arms, 22, which extend forwardly and toward each other, as illustrated in Fig. 1. The forward ends of the arms, 22, are bent forwardly, parallel to each other, and are received between the ears, 23, of a clevis, 24, which is pivoted to the tongue of the truck, 21, at its rear end.

A sector, 25, is secured to the cross bar, 13, of the arch, B, and pivoted thereto is a bell crank lever, 26, to the short arm of which is pivoted a link, 27. The forward end of the link, 27, is received between the bars, 22, and is pivoted together with the bars, 22, to the clevis, 24, by means of a bolt, 28, extended through the ears, 23, and the respective bars, 22, and link, 27.

By moving the lever rearwardly, as indicated by the arrow, 29, the tongue truck will be drawn rearwardly somewhat closer to the arch, and the arch will at the same time be pushed downwardly relative to the truck. Moving the lever in the reverse direction has the opposite effect.

The lever, 26, is provided with an ordinary pawl arrangement, 30, coacting with the sector, 25, to lock the lever in any adjusted position.

The arrangement of the bars, 22, link, 27, tongue truck, 21, and arch, B, is such that the lower end of the arms, 12, thereof normally are positioned very near the ground level, as determined by the wheels of the track, whereas the arch, A, being raised substantially from the ground by the traction wheels, 20, the casing formed by the plates, 14, 15, 16 and 17, respectively, will be inclined upwardly and rearwardly, as shown in Fig. 2. The arch, B, is secured to the plates in such a manner that when the vehicle is in normal position the arch will be substantially vertical, as shown in Fig. 2.

A pair of bracket arms, 31, are slidably mounted in the channeled sides of the arms, 12, and the arch, B, by means of bolts, 32, passing through slots, 33, in the arms, 31, and threaded into the arms, 12.

A sector, 34, is secured to one end of the cross arm, 13, of the arch, B, and a bracket, 35, to the other end thereof. Between the sector, 34, and the bracket, 35 is journaled a shaft, 36, carrying at one end a bell crank lever, 37, and at its other end a short lever, 38. To the short arm of the bell crank lever, 37, and to the lever, 38, are connected links, 39, which are in turn connected to the upper ends of the arms, 31. By loosening the bolts, 32, and moving the lever, 37, forwardly, it will be seen that the arms, 31, will be moved downwardly, thereby adjusting the height of the plow blades, 40, carried by the lower ends of the arms, 31, relative to the arch, B.

The blades, 40, are shown in Figs. 2 and 3, and comprise a pair of steel blades having sharpened noses spaced from one to four inches apart. The blades are inclined inwardly, upwardly and toward each other so that when the bulb of a beet is caught between them they will tend to raise it from the ground as they are pushed forwardly.

A beet is indicated in dotted lines at 41 in Fig. 2, about to be engaged between the blades, 40.

The blades, 40, are provided with elongated extensions, 42, which are substantially parallel at their inner edges, as indicated in Fig. 3, and which continue the action of pushing the beet upwardly from the soil.

The blades, 40, serve not only to engage the beet, but also to loosen the soil about the bulb so that it may be readily lifted by the belt mechanism of the harvester.

The lower ends of the plates, 16 and 17, respectively, are extending forwardly, as at 43, and rounded at their inner edges to points, as indicated in Fig. 1. The projecting portions, 43, serve as the frame structure for a pair of divider arms, 44, which are secured to the inner edges thereof, and which incline upwardly and away from each other in lateral directions. (See Figs. 1, 2 and 9.) The gathering arms, 44, serve to raise the beet tops to a position where they may be engaged between the belt mechanism, which I will now describe.

Mounted in bearings, 45, at the inner ends of the plates, 14, 15, 16 and 17, are parallel shafts, 46 and 47, to which are secured sprockets, 48. The shafts, 46 and 47, are positioned perpendicular to the plates in which they are mounted, and spaced near the inner edges of the same. At the lower end of the vehicle, mounted in similar bearings, 49, are two shafts, 50, upon which are secured sprockets, 51, which are preferably larger in size than the sprockets, 48, in order to facilitate gathering of the tops.

Endless belts comprising a series of links, 52, hinged together by means of coacting lugs, 53, and ears, 54, between the latter of which are cavities, 55, are mounted upon sprockets, 48 and 51, to travel therebetween. The cavities, 55, receive the teeth of sprockets, as shown in Fig. 8, and the lugs, 53, are received between the teeth of the sprockets in order to transmit driving pressure to the belts.

The paths over which the belts travel have been indicated in dotted lines in Fig. 1, and it will be noted that the opposed faces of the belts are parallel to each other and spaced slightly apart to allow the beet tops to be received therebetween.

In order to positively maintain the close spacing between the belts I provide a series of four channeled guide bars, 56, which are spring-urged toward each other by means of a mounting shown in detail in Fig. 6. Secured to the plates, 14, 15, 16 and 17, and extending between the upper and lower pairs thereof, are brackets, 57, which are spaced sufficiently near the inner edges of the plates so as not to interfere with the action of the belts. (See Fig. 1.)

Threaded into the brackets, 57, are the sleeves, 58, which are rigidly secured by means of lock nuts, 59, and in which are slidably mounted shafts, 60, welded or otherwise rigidly secured to the channelled guide bars, 56. Springs, 61, are received between the bars, 56, and the brackets, 57, and urge the channelled guide bars toward each other.

The guide bars, 56, are so spaced vertically as to receive the hinge ears, 54, of the opposed portions of the belts during a major portion of their length.

Fixed to each link of the belt are a series of pins, 62, which serve as teeth to engage the tops of the beets.

The shafts, 46 and 47, project through the plates, 14 and 15, respectively, and are geared together by spur gears, 63, secured to the upper ends thereof. The shaft, 46, projects further upwardly and is provided with a bevel gear, 64.

A pair of brackets, 65, secured to the side arms, 12, of the arch, A, support a transverse shaft, 66, to the ends of which are secured sprockets, 67, aligned with driving sprockets, 68, secured to the wheels, 20. A driving chain, 69, connects the sprockets.

Mounted in bearings, 70, secured to the plate, 14, is a shaft, 71, having a bevel gear, 72, secured to its forward end and in mesh with a bevel gear, 73, on the shaft, 66. Mounted in brackets, 74, at the rear end of the plate, 14, is a horizontal shaft, 75, operatively connected to the shaft, 71, by means of a gimbal joint, 76. On the shaft, 75, is a bevel gear, 77, in mesh with the bevel gear, 64.

It will be seen that as the machine is moved forwardly the tractor wheels, 20, will drive the shaft, 66, in the direction indicated by the arrow, 78. (See Fig. 2.) The shaft, 71, will be rotated in the direction indicated by the arrow, 79, the shafts, 46 and 47, being rotated in the direction indicated by the arrows, 80, so that the opposed portions of the belts will move rearwardly, catching the tops of the beets which are guided therebetween by the gathering arms, 44, and raising the beets upwardly, as indicated by the several dotted line positions in Fig. 2.

Mounted at the forward ends of the lower plates, 16 and 17, on their lower sides, are a pair of idler sprockets, 81. The shafts, 46 and 47, are projected below the lower plates and connected by gimbal joints, 82, to the short shafts, 83 and 83ª, upon which are mounted the sprockets, 84, similar to the sprockets, 81. Brackets, 85, support the shafts, 83 and 83ª, in proper alignment.

Splined to the shafts, 83 and 83ª, for sliding movement thereon, are a pair of sleeves, 86 and 86ª, flanged at their upper ends as at 86ᵇ, each of which is threaded, as at 87, to receive a nut, 88, for locking the disk knives, 89 and 89ª, in place between washers, 90, one of which is received against the flange, 86ᵇ. The sleeve, 86, is extended and provided with an annular slot, 91.

A shifting lever, 92, is pivoted at 93 in a bracket, 94, which is secured to an arm, 95, depending from the plate, 16, as shown in Figs. 2 and 10. The rear end of the lever, 92, loosely engages the sleeve, 86, as by a bearing, 96, and a removable cap, 97, encircling the sleeve in the slot, 91. The forward end of the lever, 92, has a fork, 98, in which is pivoted a threaded sleeve, 99.

Rotatably mounted in bearings, 100, secured to the plates, 16 and 14, and secured against longitudinal movement therein by collars, 101, is a handwheel shaft, 102, having a handwheel, 103. The shaft, 102, is threaded at its lower end, as at 104, and is threaded through the sleeve, 99.

Rotation of the handwheel, 103, will thus cause the lever, 92, to rock upon its fulcrum, and to adjust the disk knives, 89ª, carried by the shaft, 83ª, longitudinally of the shaft. The disk knife, 89, overlaps the knife, 89ª, and adjustment of the knife, 89ª, will cause sliding movement of the disk knife, 89, upon its shaft. Thus the position at which the cutting of the beets is done may be varied.

In order to guide the beets properly to the knives, 89 and 89ª, I provide a pair of endless chains, 105, mounted between the sprockets, 81 and 84, respectively to travel therebetween, and armed with projecting lugs, 106. (See Figs. 3 and 4.) The opposed portions of the chains are spaced near each other and are maintained in rigid parallel relation by means of two guide channels, 107, supported from brackets, 108, and from the brackets, 95, of which there are two, one being secured to the one illustrated in Fig. 10, opposed to the one illustrated in Fig. 10.

As the beets are raised from the ground by means of the belts, the tops or stem portions adjacent the bulbs will be guided between the opposed portions of the chains, 105, and engaged thereby. Movement of the belts upwardly and rearwardly in the machine will cause the bulbs to be drawn up against the chains, 105, and when the shoulders of the beets have become securely lodged thereagainst the further traveling of the belt rearwardly will cause the tops to gradually be pulled downwardly between the belts, which, however, will continue to urge the beets upwardly against the chains. As the beets reach the knives, 89ª, they are carried therebetween and the rotating knives will sever the tops from the bulbs.

An elevator, 108 is suspended from the lower plates by means of brackets, 109 and 110, and at its outer side is provided with a shield, 111, extended inwardly under the knives, 89 and 89ª, to guide the tops on beyond the edge of the elevator and prevent them being deposited within the same. It will be seen by inspection of Fig. 2 that the tops will be carried rearwardly by the knives after being severed, and will be released by the belts just as they escape over the rear edges of the knives.

The elevating belt, 112, is driven from a shaft, 113, which is provided with a sprocket, 114, aligned with a sprocket, 115, on the outer end of the shaft, 75, and operatively connected therewith by means of a chain, 116.

Referring again to the channelled guide bars, 56, it will be seen that they not only urge the belts toward each other, but maintain them in alignment so as to prevent sagging, and reduce wear upon the hinge joints.

The blades, 40, are so arranged relative to the belts that the belts will catch the tops of the beets shortly after they have been loosened from the soil and while the belts are pushing them upwardly so that both forces will act upon the beets simultaneously to raise them from the ground. Thus the likelihood of pulling of the tops from the beets is minimized and the possibility of bruising the beets from contact with the blades is minimized.

The adjustment of the blades by means of the lever, 37, is for the purpose of suiting the machine to different sizes of beets. For instance, where the beets are short and stocky, and the tops are not exceedingly long, it is necessary to adjust the blades closer to the gathering arms, 44, than where the tops are longer and the bulbs longer. The adjustment with the lever, 26, takes care of varying conditions of depth in the positions of the beets in the ground.

It will be seen that there is an advantage in cutting off the beets as close to the top as possible without leaving any of the stalks remaining in order that none of the beets may be wasted. As has been explained, this is effected by the use of the double chain and belt arrangement wherein the chains are disposed at an angle to the belts.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a harvester, a vehicle having side frame members connected at their forward ends by a channelled arch with vertical side arms, a pair of endless belts mounted to travel in elongated paths having their forward limits near said arch, said paths being disposed in a plane extending rearwardly and upwardly, a pair of arms mounted in the channelled side arms of said arch, for vertical adjustment relative thereto, and a pair of plow blades carried by the lower ends of said arms.

2. In a beet harvester, a frame comprising longitudinal angle bars secured together so as to form the corners of a rectangular tube inclined upwardly toward its rear end, and having central longitudinal openings in its upper and lower walls, formed by the spacing of the opposed edges of said angle bars, endless belts mounted between the upper and lower walls of said tube on each side of said openings, the ends of said belts being covered by said walls, traction wheels supporting the frame, and means for conveying power from said wheels to operate the belts.

3. In a beet harvester, forward and rear arches, longitudinal angle bars secured to said arches, so as to form the four corners of a rectangular tube inclined upwardly and rearwardly, the lateral arms of said angle bars being spaced to receive the tops of beets, substantially vertical opposed shafts mounted between said horizontal arms at their rear ends, sprockets on the shafts between the arms, aligned sprockets carried at the forward extremity of the frame, opposed endless belts carried by said sprockets, one of said shafts being extended through its arm and provided with a bevel gear, a transverse shaft supported by said rear arch, a longitudinal shaft having a driving connection with said bevel gear and with said transverse shaft, traction wheels supported by the rear arch, and a driving connection between the transverse shaft and a traction wheel.

4. In a beet harvester, forward and rear arches, longitudinal angle bars secured to said arches, so as to form the four corners of a rectangular tube inclined upwardly and rearwardly, the lateral arms of said angle bars being spaced to receive the tops of beets, substantially vertical opposed shafts mounted between said horizontal arms at their rear ends, sprockets on the shafts between the arms, aligned sprockets carried at the forward extremity of the frame, opposed endless belts carried by said sprockets, one of said shafts being extended through its arm and provided with a bevel gear, a transverse shaft supported by said rear arch, a longitudinal shaft having a driving connection with said bevel gear and with said transverse shaft, traction wheels supported by the rear arch, a driving connection between the transverse shaft and a traction wheel, an elevator carried below the rear end of the frame, extending transversely and having a longitudinally positioned driving shaft, a sprocket on said elevator driving shaft, an aligned sprocket thereabove driven from said first mentioned longitudinal shaft, and a chain connecting said sprockets.

5. In a harvesting machine, a vehicle, a pair of substantially upright shafts carried at the rear of the vehicle, sprockets on said shafts, idlers carried at the forward end of the vehicle, endless chains supported between the sprockets and idlers, the idlers being positioned at a lower level than the sprockets, and a pair of overlapped cutting disks carried by the shafts just below the chains, the upper disk being supported vertically by the lower, said disks being slidably and non-rotatably mounted on the shafts, and means for adjusting the lower disk longitudinally of the shaft comprising a lever having a bifurcated end, supported from the frame for swinging movement on a horizontal axis, a grooved hub on the lower disk receiving said bifurcated end, means for raising and lowering the free end of the lever, and a driver's seat positioned near said means.

6. In a harvesting machine, a vehicle, a pair of substantially upright shafts carried at the rear of the vehicle, sprockets on said shafts, idlers carried at the forward end of the vehicle, endless chains supported between the sprockets and idlers, the idlers being positioned at a lower level than the sprockets, and a pair of overlapped cutting disks carried by the shafts just below the chains, the upper disk being supported vertically by the lower, said disks being slidably and non-rotatably mounted on the shafts, and means for adjusting the lower disk longitudinally of the shaft comprising a lever having a bifurcated end, supported from the frame for swinging movement on horizontal axis, a grooved hub on the lower disk receiving said bifurcated end, an internally threaded sleeve carried by the other end of said lever, a hand wheel shaft journalled in the frame and having an end threaded into said sleeve, and a hand wheel on said shaft.

7. In a beet harvester, forward and rear arches, longitudinal angle bars secured to said arches, so as to form the four corners of a rectangular tube inclined upwardly and rearwardly, the lateral arms of said angle bars being spaced to receive the tops of beets, substantially vertical opposed shafts mounted between said horizontal arms at their rear ends, sprockets on the shafts between the arms, aligned sprockets carried at the forward extremity of the frame, opposed endless belts carried by said sprockets, traction wheels supporting the rear portion of the frame, means for driving the sprocket shafts from the traction wheels, so that movement of the harvester through a field of beets will cause the opposed portions of the belts to engage the beet tops and draw them upwardly between the spaced angle bars, and gathering arms formed from the extended forward ends of the lateral portions of the lower angle bars.

8. In a beet harvester, forward and rear arches, longitudinal angle bars secured to said arches, so as to form the four corners of a rectangular tube inclined upwardly and rearwardly, the lateral arms of said angle bars being spaced to receive the tops of beets, substantially vertical opposed shafts mounted between said horizontal arms at their rear ends, sprockets on the shafts between the arms, aligned sprockets carried at the forward extremity of the frame, opposed endless belts carried by said sprockets, traction wheels supporting the rear portion of the frame, and means for driving the sprocket shafts from the traction wheels, so that movement of the harvester through a field of beets will cause the opposed portions of the belts to engage the beet tops and draw them upwardly between the spaced angle bars, said belts comprising inflexible links hinged together and having depressions for the reception of sprocket teeth.

Signed at Sioux Center, in the county of Sioux and State of Iowa, this 25th day of May, 1925.

GERRIT WANDSCHEER.